United States Patent
Sakaguchi

(10) Patent No.: US 12,469,140 B2
(45) Date of Patent: Nov. 11, 2025

(54) MEDICAL IMAGE-PROCESSING APPARATUS, MEDICAL IMAGE-PROCESSING METHOD, AND STORAGE MEDIUM

(71) Applicant: CANON MEDICAL SYSTEMS CORPORATION, Otawara (JP)

(72) Inventor: Takuya Sakaguchi, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 474 days.

(21) Appl. No.: 18/049,858

(22) Filed: Oct. 26, 2022

(65) Prior Publication Data

US 2023/0137453 A1    May 4, 2023

(30) Foreign Application Priority Data

Oct. 29, 2021    (JP) ................. 2021-178136

(51) Int. Cl.
  *G06K 9/00*    (2022.01)
  *G06T 7/00*    (2017.01)
  *G06T 7/11*    (2017.01)
(52) U.S. Cl.
  CPC ............. *G06T 7/0016* (2013.01); *G06T 7/11* (2017.01); *G06T 2207/10116* (2013.01); *G06T 2207/30061* (2013.01); *G06T 2207/30104* (2013.01)
(58) Field of Classification Search
  CPC . G06T 2207/30101; G06T 2207/30061; G06T 2207/30016; G06T 2207/30036;
  (Continued)

(56) References Cited

U.S. PATENT DOCUMENTS 10,204,410 B2 *   2/2019   Zaiki .................. G06T 7/0016
11,341,636 B2 *   5/2022   Vaz ..................... A61B 6/03
(Continued)

FOREIGN PATENT DOCUMENTS

JP    2003-190148 A    7/2003
JP    2019-10391 A    1/2019

OTHER PUBLICATIONS

Sakaguchi, T., et al., "A Novel Diagnostic Approach for Assessing Pulmonary Blood Flow Distribution Using Conventional X-Ray Angiography", PLOS One, 16(6), 2021, 15 pages.
(Continued)

*Primary Examiner* — Atiba O Fitzpatrick
(74) *Attorney, Agent, or Firm* — Oblon, McClelland, Maier & Neustadt, L.L.P.

(57) ABSTRACT

A medical image-processing apparatus of an embodiment includes a processing circuitry. The processing circuitry acquires a plurality of medical images including a predetermined region and having different time phases. The processing circuitry sets a first region of interest and a second region of interest in each of the plurality of medical images. The processing circuitry derives a temporal change in first pixel values, which are pixel values on the first region of interest, on the basis of the first pixel values and derives a temporal change in second pixel values, which are pixel values on the second region of interest, on the basis of the second pixel values. The processing circuitry sets a first time window on the basis of the temporal change in the first pixel values and sets a second time window on the basis of the temporal change in the second pixel values.

9 Claims, 7 Drawing Sheets

(58) Field of Classification Search
CPC . G06T 2207/30041; G06T 2207/30084; G06T 7/0012–0016; G06T 2207/10064–10136; G06T 2207/30004–30104; G06T 2207/10072–10128; G06T 5/50; G06T 7/254; G06T 2207/20224; A61B 6/507; A61B 6/486; A61B 6/545; G06V 2201/031; G06V 2201/03–034; G01R 33/543; G01R 33/5673
See application file for complete search history.

(56) References Cited

U.S. PATENT DOCUMENTS

| | | | | |
|---|---|---|---|---|
| 2008/0146911 | A1* | 6/2008 | Miyake | A61B 5/055 600/407 |
| 2009/0316970 | A1* | 12/2009 | Kemper | G06V 10/763 382/128 |
| 2013/0044926 | A1* | 2/2013 | Kemper | G06T 7/11 382/130 |
| 2016/0078619 | A1* | 3/2016 | Hsieh | A61B 6/5205 378/4 |
| 2016/0089097 | A1* | 3/2016 | Ohishi | A61B 6/504 345/590 |
| 2017/0323440 | A1* | 11/2017 | Tsunomori | G06T 7/13 |
| 2019/0279364 | A1* | 9/2019 | Sørensen | A61B 6/503 |
| 2020/0034964 | A1* | 1/2020 | Shimamura | G06T 7/20 |
| 2020/0297240 | A1* | 9/2020 | Shimamura | G06T 7/0016 |
| 2020/0327665 | A1* | 10/2020 | Shimamura | A61B 6/541 |
| 2021/0128818 | A1* | 5/2021 | Vaz | A61B 6/507 |
| 2025/0061576 | A1* | 2/2025 | Abe | A61B 5/055 |

OTHER PUBLICATIONS

Japanese Office Action issued Apr. 22, 2025 in Japanese Patent Application No. 2021-178136, citing reference 60 therein, 5 pages.

* cited by examiner

MEDICAL IMAGE-PROCESSING APPARATUS, MEDICAL IMAGE-PROCESSING METHOD, AND STORAGE MEDIUM

CROSS-REFERENCE TO RELATED APPLICATION

The present application claims priority based on Japanese Patent Application No. 2021-178136, filed Oct. 29, 2021, the content of which is incorporated herein by reference.

FIELD

Embodiments disclosed in this specification and the drawings relate to a medical image-processing apparatus, a medical image-processing method, and a storage medium.

BACKGROUND

Technology for injecting a contrast agent into a blood vessel, acquiring a two-dimensional X-ray projection image, and generating a new image from the parameters obtained from a time-density curve in the projection image is known. For example, when the conventional technology is used to estimate pulmonary blood flow, there is a case in which timings of blood flow to the left and right lungs are slightly different, and there is a problem in that conventionally known algorithms cannot perform satisfactory estimation. Such problems are not limited to the lungs and are common to all symmetrical parts such as the kidneys, brain, limbs, and further are not limited to blood and are common to other fluids such as body fluids and exhalation that flow in or out of the body.

DETAILED DESCRIPTION

A medical image-processing apparatus, a medical image-processing method, and a storage medium according to embodiments will be described below with reference to the drawings. The medical image-processing apparatus according to an embodiment includes a processing circuit. The processing circuit acquires a plurality of medical images including a predetermined region and having different time phases. The processing circuit sets a first region of interest in a first portion that is a part of the predetermined region and sets a second region of interest in a second portion that is a part of the predetermined region and is different from the first portion in which the first region of interest is set on the basis of the plurality of medical images. The processing circuit derives temporal variations in first pixel values across the plurality of medical images on the basis of the first pixel values that are pixel values on the first region of interest and derives temporal variations in second pixel values across the plurality of medical images on the basis of the second pixel values that are pixel values on the second region of interest. The processing circuit sets a first time window for imaging the first portion on the basis of the temporal variations in the first pixel values and sets a second time window for imaging the second portion on the basis of the temporal variations in the second pixel values. Accordingly, it is possible to more accurately measure fluids that flow into and out of bilaterally symmetrical parts of the body.

The medical image-processing apparatus of the embodiment may be a component included in a medical image-processing system. Embodiments described below are merely examples and are not limiting. Further, the content described in one embodiment can be similarly applied to other embodiments in principle. For example, when a picture archiving and communication system (PACS) is introduced into the medical image-processing system, apparatuses transmit/receive medical image data in a digital imaging and communications in medicine (DICOM) format in which supplementary information is assigned to medical image data. Here, the supplementary information may include, for example, a patient identifier (ID) for identifying a patient, an examination ID for identifying an examination, an apparatus ID for identifying each apparatus, a series ID for identifying imaging performed once by each apparatus, and the like.

[Configuration of Medical Image-Processing System]

Figure 1:
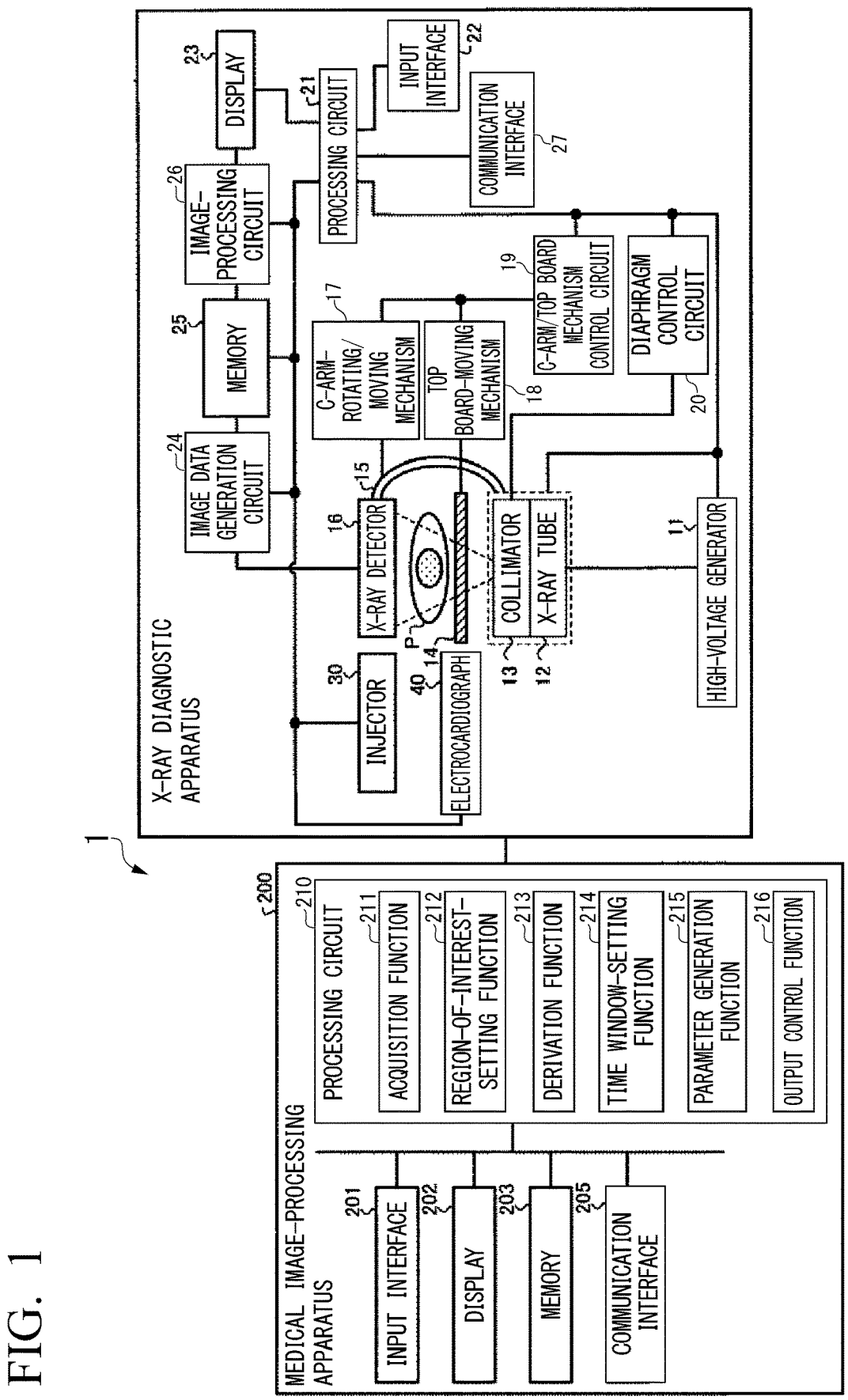
FIG. 1 is a diagram showing a configuration example of a medical image-processing system in an embodiment.

FIG. 1 is a diagram showing a configuration example of a medical image-processing system 1 according to an embodiment. The medical image-processing system 1 includes, for example, an X-ray diagnostic apparatus 100 and a medical image-processing apparatus 200. The X-ray diagnostic apparatus 100 and the medical image-processing apparatus 200 are connected via, for example, a communication network NW, such that they can communicate.

The communication network NW may be any information communication network that uses telecommunication technology. For example, the communication network NW includes a wireless/wired local area network (LAN) such as a hospital backbone LAN, an Internet network, a telephone communication network, an optical fiber communication network, a cable communication network, a satellite communication network, and the like.

The X-ray diagnostic apparatus 100 radiates X-rays to a subject P and detects X-rays that have passed through the subject P to generate a fluoroscopic medical image (hereinafter referred to as an X-ray image) of the inside of the subject P. The subject P is typically a human being (that is, a patient) but is not limited thereto, and may be another animal. As an example, the subject P is a human being in the description below.

The medical image-processing apparatus 200 performs parametric imaging on the basis of the X-ray image generated by the X-ray diagnostic apparatus 100, for example.

The medical image-processing apparatus 200 may be a single apparatus or may be a system in which a plurality of apparatuses connected via a communication network NW operate in cooperation. That is, the medical image-processing apparatus 200 may be realized by multiple computers (processors) included in a distributed computing system or a cloud computing system. Moreover, the medical image-processing apparatus 200 does not necessarily have to be a separate apparatus different from the X-ray diagnostic apparatus 100 and may be an apparatus integrated with the X-ray diagnostic apparatus 100.

[Configuration of X-Ray Diagnostic Apparatus]

The configuration of the X-ray diagnostic apparatus 100 according to an embodiment will be described below. As shown in FIG. 1, the X-ray diagnostic apparatus 100 includes a high-voltage generator 11, an X-ray tube 12, a collimator 13, a top board 14, a C-arm 15, and an X-ray detector 16. Furthermore, the X-ray diagnostic apparatus 100 includes a C-arm-rotating/moving mechanism 17, a top board-moving mechanism 18, a C-arm/top board mechanism control circuit 19, a diaphragm control circuit 20, a processing circuit 21, an input interface 22, and a display 23. Furthermore, the X-ray diagnostic apparatus 100 includes an image data generation circuit 24, a memory 25, an image-processing circuit 26, and a communication interface 27. The X-ray diagnostic apparatus 100 is connected to an injector 30 and an electrocardiogram 40. In the X-ray diagnostic apparatus 100, circuits are connected to each other and various electrical signals are transmitted/received between the circuits, and electrical signals are transmitted/received to/from the injector 30, as shown in FIG. 1.

The injector 30 is a device for injecting a contrast agent through a catheter inserted into the subject P. Here, injection of the contrast agent from the injector 30 is performed according to an injection instruction received via the processing circuit 21, which will be described later. Specifically, the injector 30 performs contrast agent injection according to a contrast agent injection start instruction and an injection stop instruction received from the processing circuit 21 which will be described later, and additionally contrast agent injection conditions including an injection rate and the like. When an operator directly inputs an injection instruction to the injector 30, the injector 30 can also start or stop injection according to the injection instruction input by the operator.

The electrocardiograph 40 an electrocardiogram (ECG) of the subject P to which a terminal (not shown) is attached and transmits the acquired electrocardiogram to the processing circuit 21, the image data generation circuit 24, and the image-processing circuit 26 along with time information.

In the X-ray diagnostic apparatus 100 shown in FIG. 1, each processing function is stored in the memory 25 (storage circuit) in the form of a computer-executable program. The C-arm/top board mechanism control circuit 19, the diaphragm control circuit 20, the processing circuit 21, the image data generation circuit 24, and the image-processing circuit 26 are hardware processors (computers) that realize respective functions by reading programs from the memory 25 and executing the programs.

A hardware processor in these processing circuits is, for example, a circuit (circuitry) such as a central processing unit (CPU), a graphics-processing unit (GPU), an application-specific integrated circuit (ASIC), or a programmable logic device (e.g., a simple programmable logic device (SPLD), a complex programmable logic device (CPLD), or a field-programmable gate array (FPGA)). Instead of storing a program in the memory 25, the program may be directly embedded in the circuitry of a hardware processor. In this case, the hardware processor realizes functions by reading and executing the program embedded in the circuitry. The aforementioned program may be stored in the memory 25 in advance, or may be stored in a non-transitory storage medium such as a DVD or a CD-ROM and installed in the memory 25 from the non-transitory storage medium by setting the non-transitory storage medium in a drive device (not shown) of the X-ray diagnostic apparatus 100. The hardware processor is not limited to being configured as a single circuit, and may be configured as one hardware processor by combining a plurality of independent circuits to realize each function. Further, a plurality of components may be integrated into one hardware processor to realize each function.

The high-voltage generator 11 generates a high voltage under the control of the processing circuit 21 and supplies the generated high voltage to the X-ray tube 12. The X-ray tube 12 generates X-rays using the high voltage supplied from the high-voltage generator 11.

The collimator 13 focuses the X-rays generated by the X-ray tube 12 such that the X-rays generated by the X-ray tube 12 are selectively radiated to a region of interest of the subject P under the control of the diaphragm control circuit 20. For example, the collimator 13 has four slidable diaphragm blades. The collimator 13 focuses the X-rays generated by the X-ray tube 12 and radiates the X-rays to the subject P by sliding these diaphragm blades under the control of the diaphragm control circuit 20. The top board 14 is a bed on which the subject P is placed and is disposed on a bed which is not shown.

The X-ray detector 16 detects X-rays that have passed through the subject P. For example, the X-ray detector 16 includes detection elements arranged in a matrix form. Each detection element converts the X-rays that have passed through the subject P into an electric signal, accumulates the electric signal, and transmits the accumulated electric signal to the image data generation circuit 24.

The C-arm 15 holds the X-ray tube 12, the collimator 13 and the X-ray detector 16. The X-ray tube 12 and the collimator 13 are arranged to face the X-ray detector 16 with the subject P interposed therebetween by the C-arm 15. Although a case where the X-ray diagnostic apparatus 100 is a single plane is described as an example in FIG. 1, the embodiment is not limited thereto and the X-ray diagnostic apparatus may be a biplane.

The C-arm-rotating/moving mechanism 17 is a mechanism for rotating and moving the C-arm 15, and the top board-moving mechanism 18 is a mechanism for moving the top board 14. The C-arm/top board mechanism control circuit 19 controls the C-arm-rotating/moving mechanism 17 and the top board-moving mechanism 18 under the control of the processing circuit 21, thereby adjusting rotation and movement of the C-arm 15 and movement of the top board 14. The diaphragm control circuit 20 controls a radiation range of X-rays radiated to the subject P by adjusting a degree of opening of the diaphragm blades of the collimator 13 under the control of the processing circuit 21.

The image data generation circuit 24 generates image data using electrical signals converted from X-rays by the X-ray detector 16 and stores the generated image data in the memory 25. For example, the image data generation circuit 24 performs current/voltage conversion, analog (A)/digital (D) conversion, and parallel/serial conversion on electrical signals received from the X-ray detector 16 to generate image data. For example, the image data generation circuit 24 generates image data (mask image) imaged with no contrast agent injected and image data (contrast image) imaged with a contrast agent injected. The image data generation circuit 24 then stores the generated mask image and contrast image in the memory 25.

The memory 25 is realized by, for example, a random-access memory (RAM), a semiconductor memory device such as a flash memory, a hard disk, or an optical disc. These non-transitory storage media may be realized by other storage devices connected via the communication network NW, such as a network attached storage (NAS) and external storage server devices. The memory 25 may also include non-transitory storage media such as a read-only memory (ROM) and a register. The memory 25 stores image data generated by the image data generation circuit 24, image data of the subject P before and after contrast agent administration, a difference image which will be described later, and the like.

The image-processing circuit 26 performs various types of image processing on the image data stored in the memory 25. For example, the image-processing circuit 26 reads the mask image and the contrast image stored in the memory 25 and performs subtraction (log sub) to generate a difference image.

Meanwhile, the image-processing circuit 26 can minimize misalignment (mis-registration) due to body movement by using one frame immediately before contrast agent administration as a mask image. The image-processing circuit 26 can also perform noise reduction processing using an image-processing filter such as a moving average (smoothing) filter, a Gaussian filter, or a median filter. That is, the image-processing circuit 26 can perform preprocessing including positional deviation correction and noise removal on each of a plurality of X-ray image groups imaged over time using a contrast agent.

The input interface 22 receives various input operations from the operator, converts the received input operations into electrical signals, and outputs the electrical signals to the processing circuit 21. For example, the input interface 22 includes a mouse, a keyboard, a trackball, a switch, a button, a joystick, a touch panel, and the like. The input interface 22 may be, for example, a user interface that receives voice input, such as a microphone. When the input interface 22 is a touch panel, the input interface 22 may also include a display function of the display 23 which will be described later.

Further, the input interface 22 in this specification is not limited to one having physical operation components such as a mouse and a keyboard. For example, examples of the input interface 22 also include an electrical signal-processing circuit that receives an electrical signal corresponding to an input operation from an external input device provided separately from the apparatus and outputs the electrical signal to the control circuit.

For example, the operator may input an operation for setting a predetermined area (for example, a correction processing target area within a difference image) to the input interface 22.

The display 23 displays various types of information. For example, the display 23 displays images (difference images and color images by parametric imaging) generated by the processing circuit 21, a graphical user interface (GUI) for receiving various input operations from the operator, and the like. For example, the display 23 is a liquid crystal display (LCD), a cathode ray tube (CRT) display, an organic electroluminescence (EL) display, or the like.

The communication interface 27 communicates with other apparatuses such as the medical image-processing apparatus 200 connected via the communication network NW. For example, the communication interface 27 is realized by a network card, a network adapter, a network interface controller (NIC), or the like. In FIG. 1, the communication interface 27 transmits X-ray images stored in the memory 25 to the medical image-processing apparatus 200 under the control of the processing circuit 21.

The processing circuit 21 controls the overall operation of the X-ray diagnostic apparatus 100. For example, the processing circuit 21 executes various types of processing by reading a program corresponding to a control function for controlling the entire apparatus from the memory 25 and executing the program. For example, the processing circuit 21 controls the high-voltage generator 11 according to an instruction of the operator transferred from the input interface 22 and adjusts a voltage supplied to the X-ray tube 12, thereby controlling an X-ray dose radiated to the subject P and ON/OFF of X-rays. Further, for example, the processing circuit 21 controls the C-arm/top board mechanism control circuit 19 according to an instruction of the operator and adjusts the rotation and movement of the C-arm 15 and the movement of the top board 14. Further, for example, the processing circuit 21 controls the diaphragm control circuit 20 according to an instruction of the operator and controls a radiation range of X-rays radiated to the subject P by adjusting a degree of opening of the diaphragm blades of the collimator 13.

Further, the processing circuit 21 controls image data generation processing by the image data generation circuit 24, image processing by the image-processing circuit 26, analysis processing, or the like according to instructions of the operator. The processing circuit 21 also controls the display 23 to display a GUI for receiving instructions of the operator, images stored in the memory 25, and the like. The processing circuit 21 also controls injection timing of a contrast agent by transmitting contrast agent injection start and end signals to the injector 30. The processing circuit 21 also associates time information of an ECG received from the electrocardiograph 40 with time information of image data generated by the image data generation circuit 24.

[Configuration of Medical Image-Processing Apparatus]

As shown in FIG. 1, the medical image-processing apparatus 200 according to an embodiment includes an input interface 201, a display 202, a memory 203, a communication interface 205, and a processing circuit 210.

The input interface 201 receives various input operations from the operator, converts the received input operations into electrical signals, and outputs the electrical signals to the processing circuit 210. For example, the input interface 201 includes a mouse, a keyboard, a trackball, a switch, a button, a joystick, a touch panel, and the like. The input interface 201 may be, for example, a user interface that receives voice input, such as a microphone. When the input interface 201 is a touch panel, the input interface 201 may also have a display function of the display 202 which will be described later.

The input interface 201 in this specification is not limited to one having physical operation parts such as a mouse and a keyboard. For example, the input interface 201 also includes an electrical signal-processing circuit that receives an electrical signal corresponding to an input operation from an external input device provided separately from the apparatus and outputs the electrical signal to the control circuit.

The display 202 displays various types of information. For example, the display 202 displays an image generated by the processing circuit 210, a GUI for receiving various input operations from the operator, and the like. For example, the display 202 is an LCD, a CRT display, an organic EL display, or the like.

The memory 203 is realized by, for example, a RAM, a semiconductor memory device such as a flash memory, a hard disk, or an optical disc. These non-transitory storage media may be realized by other storage devices connected via the communication network NW such as NAS and external storage server devices. Further, the memory 203 may include a non-transitory storage medium such as a ROM or a register. The memory 203 stores X-ray images received from the X-ray diagnostic apparatus 100. Specifically, the memory 203 stores X-ray images such as a mask image, a contrast images, and a differential image.

The communication interface 205 communicates with other apparatuses such as the X-ray diagnostic apparatus 100 connected via the communication network NW. For example, the communication interface 205 is realized by a network card, a network adapter, a network interface controller (NIC), or the like. In FIG. 1, the communication interface 205 receives an X-ray image from the X-ray diagnostic apparatus 100 and outputs the received X-ray image to the processing circuit 210 under the control of the processing circuit 210.

The processing circuit 210 includes, for example, an acquisition function 211, a region-of-interest-setting function 212, a derivation function 213, a time window-setting function 214, a parameter generation function 215, and an output control function 216. Details of each of these functions will be described later using flowcharts. The acquisition function 211 is an example of an "acquisition unit," and the region-of-interest-setting function 212 is an example of a "region-of-interest-setting unit." The derivation function 213 is an example of a "derivation unit," the time window-setting function 214 is an example of a "time window-setting unit," and the parameter generation function 215 is an example of a "parameter generation unit."

The processing circuit 210 realizes these functions by, for example, a hardware processor (computer) executing a program stored in the memory 203 (storage circuit).

The hardware processor in the processing circuit 210 refers to, for example, a circuit (circuitry) such as a CPU, a GPU, an application-specific integrated circuit, a programmable logic device (e.g., a simple programmable logic device, a complex programmable logic device, or a field-programmable gate array). Instead of storing the program in the memory 203, the program may be directly embedded in the circuitry of the hardware processor. In this case, the hardware processor realizes functions by reading and executing the program embedded in the circuitry. The above-described program may be stored in the memory 203 in advance, or may be stored in a non-transitory storage medium such as a DVD or a CD-ROM, and installed in the memory 203 from the non-transitory storage medium by setting the non-transitory storage medium in a drive device (not shown) of the processing apparatus 200. The hardware processor is not limited to being configured as a single circuit, and may be configured as one hardware processor by combining a plurality of independent circuits to realize each function. Further, a plurality of components may be integrated into one hardware processor to realize each function.

In the medical image-processing system 1 according to the present embodiment, for example, parametric imaging is applied to lung angiography. This parametric imaging is used for determination immediately after heart disease surgery and for surgical planning before heart disease surgery. A parametric imaging application target is not limited to the "lung" and may be another region such as kidneys, brains, hands, feet, ears, eyes, and breasts as long as it is a set of symmetrical regions (including organs, tissues and the like). For example, the left lung is an example of a "first portion" and the right lung is an example of a "second portion." In addition, the parametric imaging application target is not limited to "blood" and may be other body fluids or exhalation as long as it is an object that flows into or out of the body of the subject P. In the following description, as an example, a parametric imaging application target is blood flowing through blood vessels in the lungs.

For example, in pulmonary angiography, a catheter is placed in the pulmonary artery and a contrast agent is administered. Here, the contrast agent flows along pulmonary circulation, where blood leaves the heart and returns to the heart through the lungs. That is, when blood flows from the right ventricle to the pulmonary artery in synchronization with a heartbeat, the contrast agent also flows separately into the left and right pulmonary arteries. Then, the contrast agent that has flowed into the pulmonary artery gradually reaches the alveoli, and then returns to the left atrium via the pulmonary veins. A time required for pulmonary circulation is said to be 4 to 5 seconds for adults, and pulmonary circulation for children is shorter than 4 to 5 seconds. Further, in a normal heart, the ratio of the amounts of blood entering the left and right lungs is approximately 1:1.

Here, heart diseases include a designated intractable disease called transposition of the great arteries (TGA). Although the aorta originates from the left ventricle and the pulmonary artery originates from the right ventricle in a normal heart, the aorta and pulmonary artery are dislocated and thus the aorta originates from the right ventricle and the pulmonary artery from the left ventricle in TGA. Although the ratio of the amounts of blood entering the left lung and the right lung is approximately 1:1 in a normal heart, as described above, the ratio of the amounts of blood entering the left lung and the right lung may not be 1:1 in TGA. For this reason, for example, in determining a surgical plan immediately after TGA surgery or before TGA surgery, it is conceivable that parametric imaging technology is applied to pulmonary angiography to observe the ratio of the left and right contrast agent amounts in the lung tissues.

However, when the parametric imaging technology is applied to pulmonary angiography, the retention time of the contrast medium in the pulmonary microcirculatory system is as short as 1 second or less, and the contrast medium is affected by heartbeat motion, and thus it is not possible to accurately measure blood flow simply by parameterizing a time-density curve.

Figure 2:
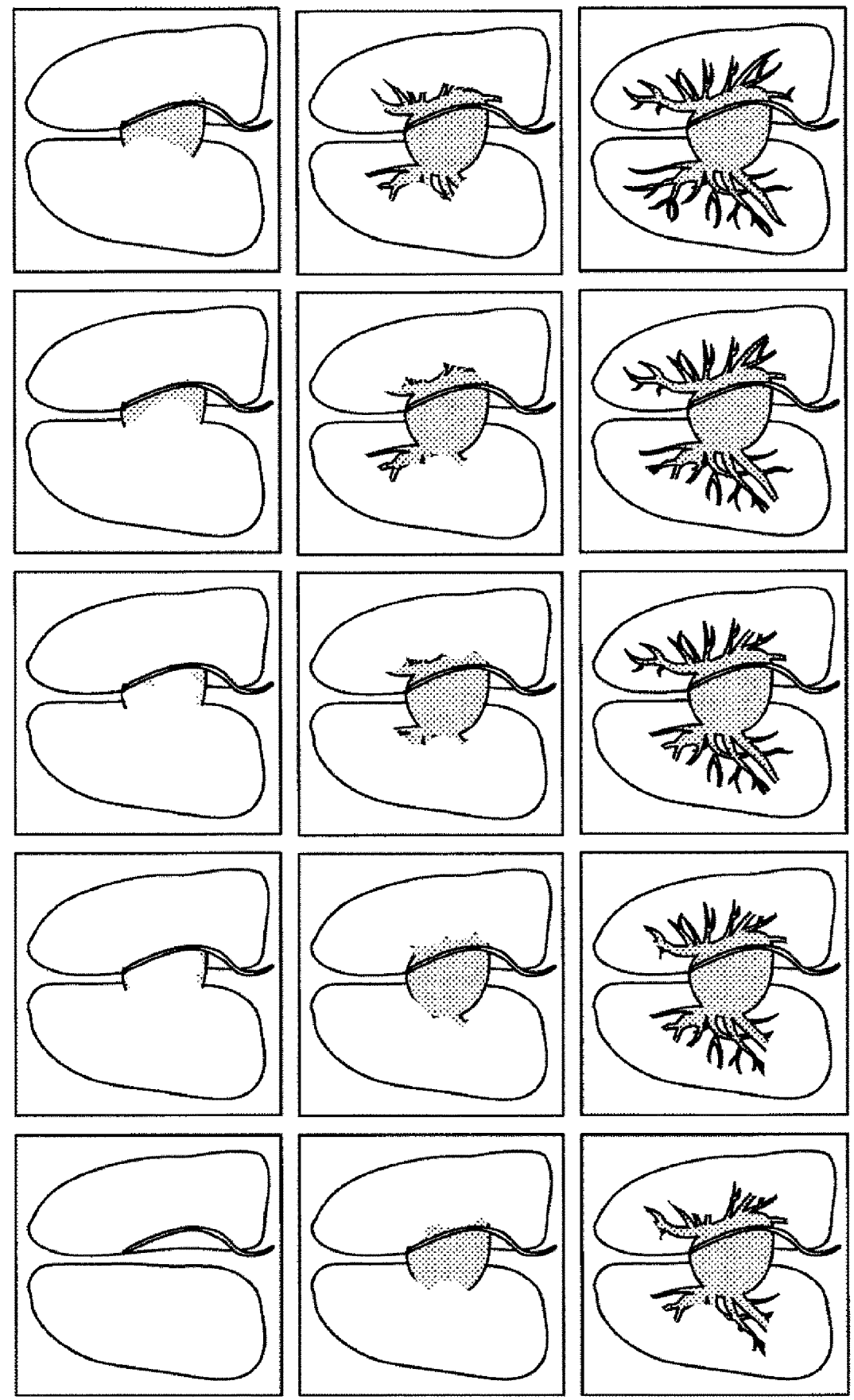
FIG. 2 is a diagram describing pulmonary angiography.

FIG. 2 is a diagram describing pulmonary angiography. FIG. 2 shows a plurality of X-ray images obtained by imaging the pulmonary vessels in chronological order in the presence of a contrast agent. That is, FIG. 2 shows a plurality of X-ray images having different time phases. In FIG. 2, the passage of time is shown from the top to the bottom, and the passage of time is shown from left to right in each row. In addition, FIG. 2 shows X-ray images until 1 second from immediately after administration of the contrast medium.

As shown in FIG. 2, when the contrast agent influx from the pulmonary artery to the alveoli is estimated from time-density curves of images, the amount of the contrast agent in the alveoli increases for about 1 second immediately after administration of the contrast agent. That is, the X-ray images shown in the upper part of FIG. 2 shows a state in which the contrast agent accumulates in the pulmonary artery. The X-ray image shown in the middle left end of FIG. 2 is an X-ray image at a timing when the contrast agent flows from the pulmonary artery into the alveoli. The X-ray images shown in the middle and lower parts of FIG. 2 show a state in which the alveoli are stained over time.

Thereafter, the contrast agent that has reached the alveoli flows away after 1 second. Accordingly, although only the increasing amount is observed for about 1 second immediately after administration of the contrast agent, but after 1 second, a difference between the increasing amount and the decreasing amount is observed. In addition, since the contrast agent flowing out of the alveoli passes through the pulmonary veins and overlaps on a two-dimensional image, observed pixel values include pixel values of the pulmonary veins in addition to pixel values of the alveoli. Therefore, in order to simplify measurement, it is desirable to use only data for about 1 second after administration of the contrast agent.

Furthermore, the heart of the subject P beats during X-ray imaging. The contrast agent injected into the pulmonary artery flows in response to heartbeat motion rather than gradually flowing toward the alveoli. That is, the contrast agent accumulates in the pulmonary artery during the diastole of the heart and the contrast agent flows out from the pulmonary artery into the alveoli all at once during the systole of the heart. Therefore, even if the blood flow is measured at an arbitrary timing, the blood flow is not accurate, and it is necessary to measure the blood flow at an appropriate timing in consideration of heartbeat motion. For these reasons, it is desirable to calculate parameters, which will be described later, only from data at an appropriate timing on the basis of a time-density curve of density in an X-ray image observed with heartbeat motion.

If a contrast agent administration timing has deviated from a heartbeat motion timing, the contrast agent flows into the lungs during the administration of the contrast agent. If there is such an inflow, the amount of administered contrast agent decreases and thus the blood flow cannot be accurately measured using data of the initial heartbeat (hereinafter referred to as the first heartbeat). In this case, more accurate measurement would be measuring flow due to a second heartbeat that follows the first heartbeat rather than measuring flow due to the first heartbeat.

It is not desirable to use a third heartbeat. The third heartbeat may result in a phase in which the contrast agent flows out of the alveoli into the pulmonary veins. In addition, since the pulmonary veins are superposed on a two-dimensional image, an extra element is included in a measured signal value.

As described above, it may be difficult to accurately measure the blood flow because it is not possible to specify a timing of the heartbeat at which the blood flow can be accurately measured.

In addition, there are cases in which the timing of blood flowing to the left lung and the timing of blood flowing to the right lung do not match and deviate, and thus it is necessary to consider this timing deviation.

Therefore, in order to accurately measure the blood flow in pulmonary angiography, the medical image-processing apparatus 200 of the present embodiment sets a region of interest (ROI) in each of the left lung and the right lung on time-series X-ray images, and derives time-density curves (TDC) representing temporal changes in pixel values in the ROI on the basis of the pixel values in the ROI. At this time, the medical image-processing apparatus 200 independently (individually) determines time intervals (hereinafter referred to as time windows) for measuring the blood flow for the right lung and the left lung. The medical image-processing apparatus 200 acquires data on the basis of time-density curves for which the time windows are set, examines the characteristics of the acquired data, and identifies heartbeat data used for measurement. Then, the medical image-processing apparatus 200 generates parameters used for parametric imaging using the identified heartbeat data.

[Processing Flow of Medical Image-Processing Apparatus]

Figure 3:
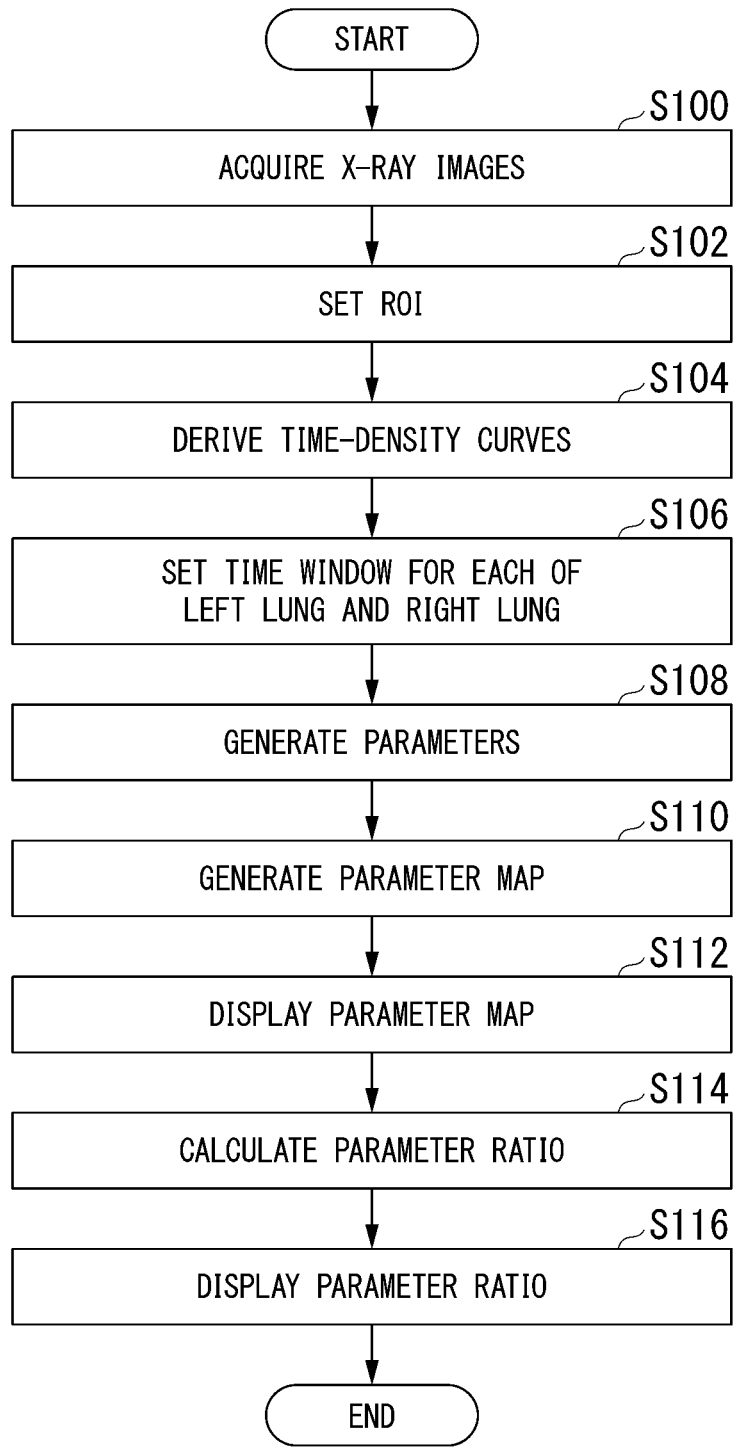
FIG. 3 is a flowchart showing a flow of a series of processing of a processing circuit in an embodiment.

Processing of each function performed by the processing circuit 210 of the medical image-processing apparatus 200 will be described below with reference to a flowchart. FIG. 3 is a flow chart showing a flow of a series of processing of the processing circuit 210 according to an embodiment.

First, the acquisition function 211 selects, from among time-series X-ray images (a plurality of X-ray images having different time phases as shown in FIG. 2) captured in chronological order after injection of a contrast agent, time-series X-ray images after the contrast agent has reached a target region for imaging (that is, the lungs) (step S100).

For example, the acquisition function 211 may acquire time-series X-ray images from the X-ray diagnostic apparatus 100 via the communication interface 205, or when time-series X-ray images have already been stored in the memory 203, the acquisition function 211 may read time-series X-ray images from the memory 203.

For example, the acquisition function 211 may acquire time-series difference images as X-ray images. Alternatively, the acquisition function 211 may acquire a time-series difference image by acquiring a mask image and a time-series contrast image and subtracting the acquired mask image and the time-series contrast image.

Specifically, the acquisition function 211 may acquire time-series X-ray images using any of the following three methods.

(First Method)

The acquisition function 211 acquires continuous time-series X-ray images on the basis of pixel values of a difference image. For example, the acquisition function 211 acquires difference images generated in chronological order from the memory 203. Then, the acquisition function 211 calculates pixel values of each difference image, and identifies difference images in which calculated pixel values are equal to or greater than a first threshold value. In addition, the acquisition function 211 identifies a difference image in which calculated pixel values have initially become a maximum value in chronological order from the difference images in which pixel values are equal to or greater than the first threshold value. Then, the acquisition function 211 acquires X-ray images from a difference image having pixel values that are initially equal to or greater than the first threshold value in chronological order to the difference image having pixel values that initially reach the maximum value in chronological order.

(Second Method)

The acquisition function 211 identifies continuous time-series X-ray images on) the basis of electrocardiographic waveforms. In this case, the acquisition function 211 uses a time at which the contrast agent is injected as a reference time, identifies X-ray images corresponding to the electrocardiographic waveforms from X-ray images corresponding to the reference time, and acquires continuous time-series of X-ray images.

(Third Method)

The acquisition function 211 acquires X-ray images designated by the operator via the input interface 201 as continuous time-series X-ray images. The acquisition function 211 may arbitrarily combine the first to third methods to acquire continuous time-series X-ray images.

Next, the region-of-interest-setting function 212 sets a region of interest for each of the time-series X-ray images acquired by the acquisition function 211 (step S102). That is, the region-of-interest-setting function 212 sets regions of interest for a plurality of X-ray images captured in chronological order. For example, the region-of-interest-setting function 212 may set a region of interest in each X-ray image according to an operation of the operator input to the input interface 201.

Figure 4:
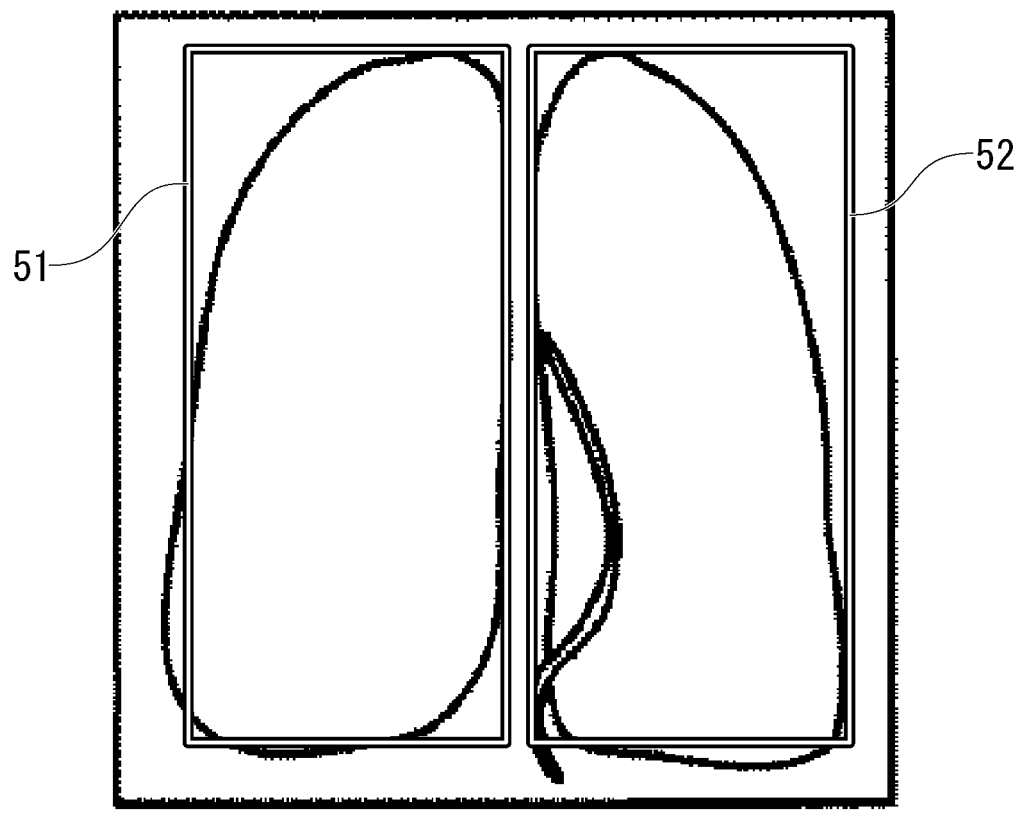
FIG. 4 is a diagram showing an example of an X-ray image in which a region of interest is set.

FIG. 4 is a diagram showing an example of an X-ray image in which regions of interest are set. For example, the operator sets regions of interest in the time-series X-ray image via the input interface 201. As shown, when the left and right lungs are present on the X-ray image, the operator sets a first region of interest 51 such that it includes the left lung, and then sets a second region of interest 52 such that it includes the right lung. If other regions such as the brain and kidneys are present on the X-ray image, the operator may set regions of interest for the left and right regions.

In addition, the region-of-interest-setting function 212 may identify the left lung and the right lung on each X-ray image using an image analysis method such as pattern matching without depending on the operator's input to the input interface 201 and automatically set a region of interest for each of the left lung and the right lung.

Returning to the description of the flowchart, next, the derivation function 213 derives time-density curves representing temporal changes in statistical values of pixel values in the regions of interest on the basis of the pixel values of the regions of interest set in respective time-series X-ray images (step S104). The statistical values may be, for example, the sums of pixel values in the regions of interest, the averages, or other statistical index values. In the following description, it is assumed that a pixel value refers to a statistical value of the pixel value unless otherwise specified.

In time-series X-ray images, the first region of interest 51 is set in the left lung and the second region of interest 52 is set in the right lung. Therefore, the derivation function 213 derives a curve obtained by arranging pixel values (an example of "first pixel values") of the first region of interest 51 on each X-ray image on the time axis and connecting them for each heartbeat, as a first time-density curve representing temporal changes in the pixel values in the first region of interest 51. Similarly, the derivation function 213 derives a curve obtained by arranging pixel values (an example of "second pixel values") of the second region of interest 52 on each X-ray image on the time axis and connecting time for each heartbeat, as a second time-density curve representing temporal changes in the pixel values in the second region of interest 52.

Further, the derivation function 213 derives a third time-density curve by combining the first time-density curve and the second time-density curve. This third time-density curve is a time-density curve representing temporal changes in pixel values obtained by combining the pixel values on the first region of interest 51 set in the left lung and the pixel values on the second region of interest 52 set in the right lung. In other words, the third time-density curve is a time-density curve representing temporal changes in pixel values of the entire lung. "Combining time-density curves" or "combining pixel values" may mean taking the sum or average thereof. The pixel values obtained by combining the pixel values on the first region of interest 51 set in the left lung and the pixel values on the second region of interest 52 set in the right lung are an example of "third pixel values."

Next, the time window-setting function 214 determines a heartbeat (hereinafter referred to as a heartbeat of interest) to be used for measurement and independently (individually) sets time windows for the left lung and the right lung on the basis of the first time-density curve, the second time-density curve, and the third time-density curve derived for the heartbeat of interest (step S106).

(Determination of Heartbeat of Interest and Setting of Time Window)

Figure 5:
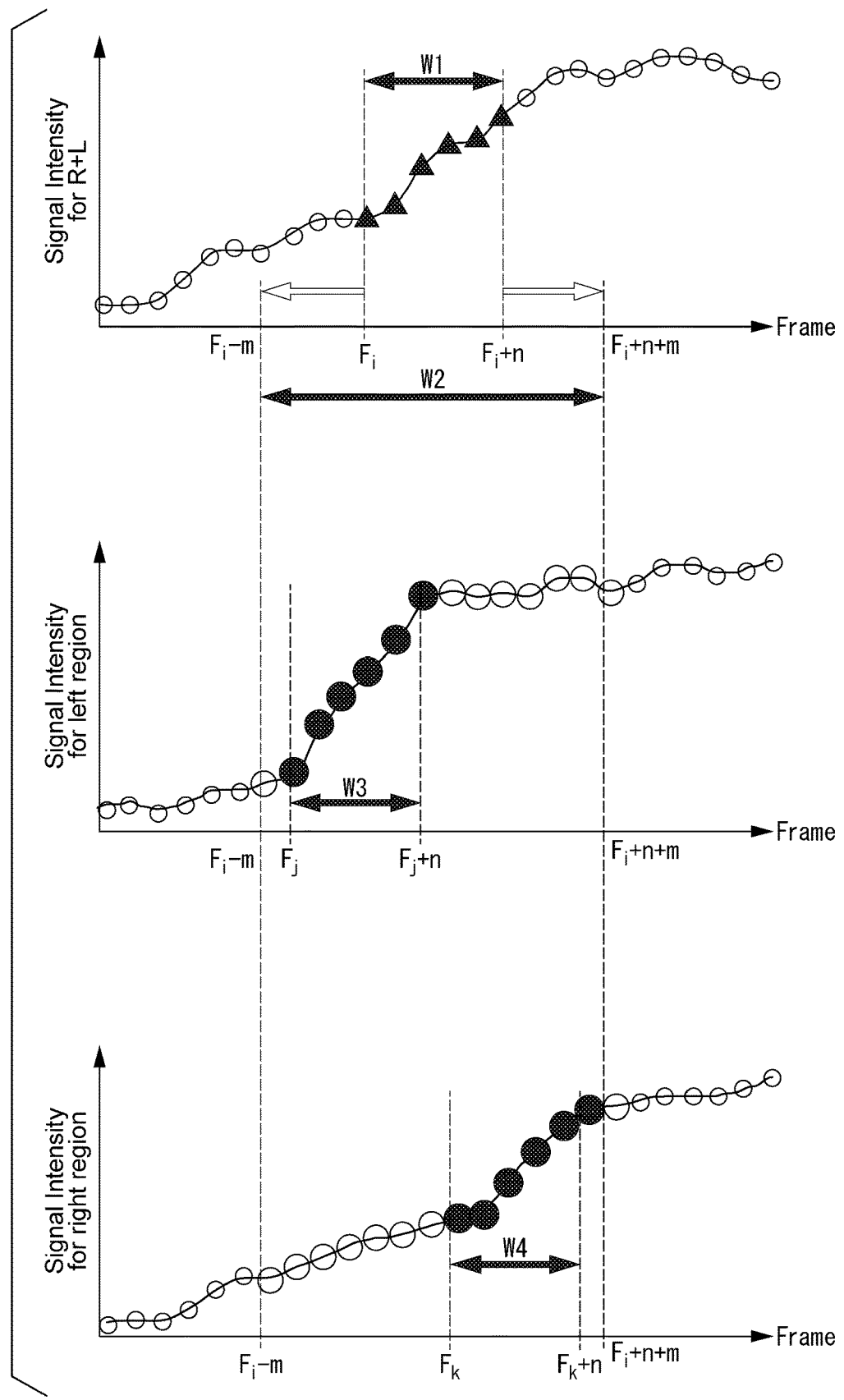
FIG. 5 is a diagram describing a method for determining a heartbeat of interest and setting a time window.

FIG. 5 is a diagram describing a method for determining a heartbeat of interest and setting a time window. In the figure, the upper part represents the third time-density curve, the middle part represents the first time-density curve, and the lower part represents the second time-density curve. In all cases, the horizontal axis represents that X-ray images (frames) are continuous in time series, and the vertical axis represents X-ray signal intensity. That is, the horizontal axis can be read as representing time, and the vertical axis can be read as representing pixel values.

First, the time window-setting function 214 sets a time window W1, which is a predetermined time interval, for the third time-density curve (refer to the upper part of the figure). The time window W1 is a period corresponding to n frames (n points on the curve). If an X-ray image is 30 fps and the interval between frames is about 33 [msec.], n may be 6, for example. The time window W1 is an example of a "third time window."

For example, the time window-setting function 214 calculates a parameter representing a degree of temporal change in pixel values between a plurality of successive frames within the time window W1 while scanning the time window W1 along the time axis on the third time-density curve. In other words, the time window-setting function 214 calculates a parameter representing a degree of temporal change in the contrast medium density on X-ray images captured within the time window W1.

The parameter representing a degree of temporal change in pixel values/density is, for example, the slope of the third time-density curve per unit time. The unit time is a time corresponding to the time window W1.

Further, the parameter representing a degree of temporal change in pixel values/density may be the difference between the maximum value and the minimum value of the third time-density curve per unit time, or may be the area of the third time-density curve per unit time.

For example, the time window-setting function 214 scans the time window W1 on the third time-density curve while shifting it frame by frame, and calculates parameters from a plurality of frames in a period from an i-th frame $F_i$ to an (i+n)-th frame $F_{i+n}$. The time window-setting function 214 selects the maximum value from a plurality of parameters obtained while scanning the time window W1 on the third time-density curve. Then, the time window-setting function 214 selects a heartbeat of interest.

When the heartbeat of interest is selected, the time window-setting function 214 determines a time at which the parameter on the third time-density curve with respect to the heartbeat of interest has reached the maximum value (that is, the position of the time window W1 on the time axis when the parameter has reached the maximum value during scanning of the time window W1) as a reference time.

The time window-setting function 214 sets a time window W2 in each of the first time-density curve and the second time-density curve with respect to the heartbeat of interest on the basis of the reference time. The time window W2 is a period that is a candidate for setting time windows W3 and W4 which will be described later at the time of setting the time window W3 on the first time-density curve with respect to the heartbeat of interest and setting the time window W4 on the second time-density curve with respect to the heartbeat of interest. That is, the time windows W3 and W4 are permitted to be set within the time window W2, and the time windows W3 and W4 are prohibited to be set outside the time window W2.

For example, it is assumed that the time window W1 is set in the period from the i-th frame $F_i$ to the (i+n)-th frame $F_{i+n}$ on the third time-density curve in the upper part of the figure, and the parameter at that time is maximized. In this case, ($F_i$-$F_{i+n}$) is determined as the reference time. The time window-setting function 214 sets, as the second time window W2, a period obtained by adding m frames to the reference time $F_i$-$F_{i+n}$ and subtracting m frames therefrom, that is, a period from an (i−m)-th frame $F_{i+m}$ to an (i+n+m)-th frame $F_{i+n}$+m. The time window W2 is a period equal to or shorter than one heartbeat. For example, if an X-ray image is 30 fps and n is 6, m may be 4 (that is, the time window W2 may be a period of about 0.5 seconds corresponding to one heartbeat). The time window W2 is an example of a "fourth time window."

Next, the time window-setting function 214 sets the time window W3 within the time window W2 of the first time-density curve with respect to the heartbeat of interest (refer to the middle part of the figure). Like the time window W1, the time window W3 is typically a period corresponding to n frames (n points on the curve). The time window W3 is an example of a "first time window."

For example, the time window-setting function 214 scans the time window W3 while shifting it frame by frame within the time window W2 of the first time-density curve with respect to the heartbeat of interest, and calculates parameters from a plurality of frames in a period from a j-th frame $F_j$ to a (j+n)-th frame $F_{j+n}$. That is, the time window-setting function 214 searches for a section in which the parameters are maximized while scanning the time window W3. When the time window-setting function 214 finds a section within the time window W2 in which the parameters are maximized, the time window-setting function 214 fixes the time window W3 to the section.

Similarly, the time window-setting function 214 sets the time window W4 within the time window W2 of the second time-density curve with respect to the heartbeat of interest (refer to the lower part of the figure). The time window W4 is typically a period corresponding to n frames (n points on the curve) like the time windows W1 and W3. The time window W4 is an example of a "second time window."

For example, the time window-setting function 214 scans the time window W4 while shifting it frame by frame within the time window W2 of the second time-density curve with respect to the heartbeat of interest, and calculates parameters from a plurality of frames in a period from a k-th frame $F_k$ to a (k+n)-th frame $F_{k+n}$. That is, the time window-setting function 214 searches for a section in which the parameters are maximized while scanning the time window W4. When the time window-setting function 214 finds a section within the time window W2 in which the parameters are maximized, the time window-setting function 214 fixes the time window W4 to the section.

Returning to the description of the flowchart, next, the parameter generation function 215 generates (calculates) a parameter in each of the time windows W3 and W4 fixed by the time window-setting function 214 (step S108). That is, the parameter generation function 215 generates a parameter (an example of the "second parameter") representing a degree of temporal change in the concentration of the contrast agent injected into the right lung within the window W4 while generating a parameter (an example of a "first parameter") representing a degree of temporal change in the concentration of the contrast agent injected into the left lung within the time window W3.

Next, the parameter generation function 215 generates a parameter map in which each generated parameter is associated with each position on an X image space (step S110). For example, the parameter generation function 215 performs parametric imaging on the basis of the parameter with respect to the left lung and the parameter with respect to the right lung generated using different time windows to generate the parameter map. More specifically, the parameter generation function 215 generates, as the parameter map, an image in which each pixel on the image is colored with a color corresponding to a calculated parameter value. The parameter generation function 215 may generate the parameter map as a still image or a moving image.

Next, the output control function 216 causes the display 202 to display the parameter map generated by the parameter generation function 215 (step S112). When the parameter map is a still image, the output control function 216 may arrange a predetermined number of time-series parameter maps and cause the display 202 to display them. Further, when the parameter map is a moving image, the output control function 216 causes the display 202 to display the parameter map as a moving image. This allows the operator to visually recognize the blood flow to the left and right lungs. The output control function 216 may transmit the parameter map to the X-ray diagnostic apparatus 100 via the communication interface 205. In this case, the processing circuit 21 of the X-ray diagnostic apparatus 100 may cause the display 23 to display the parameter map.

Next, the parameter generation function 215 calculates the ratio between the parameter with respect to the left lung and the parameter with respect to the right lung, which are generated using different time windows (step S114).

Next, the output control function 216 causes the display 202 to display the ratio between the parameters of the left and right lungs calculated by the parameter generation function 215 (step S116). This allows the operator to more accurately ascertain the blood flow to the left and right lungs. The output control function 216 may transmit the parameter ratio to the X-ray diagnostic apparatus 100 via the communication interface 205. In this case, the processing circuit 21 of the X-ray diagnostic apparatus 100 may cause the display 23 to display the parameter ratio. Accordingly, processing of this flowchart ends.

According to the embodiment described above, the medical image-processing apparatus 200 acquires time-series X-ray images (a plurality of X-ray images having different time phases) including a set of bilaterally symmetrical regions. The medical image-processing apparatus 200 sets the first region of interest 51 in one region (for example, the left lung) of the set of bilaterally symmetrical regions and sets the second region of interest 52 in another region (for example, the right lung) in each of the time-series X-ray images. The medical image-processing apparatus 200 derives the first time-density curve on the basis of pixel values (an example of "first pixel values") on the first region of interest 51 and derives the second time-density curve on the basis of pixel values (an example of "second pixel values") on the second region of interest 52. The medical image-processing apparatus 200 sets the time window W3 for parametric imaging of one region on the basis of the first time-density curve and sets the time window W4 for parametric imaging of another region on the basis of the second time-density curve. Accordingly, it is possible to measure blood flow more accurately in pulmonary angiography while curbing the influence of a difference between a timing of blood flowing to the left lung and a timing of blood flowing to the right lung.

OTHER EMBODIMENTS

Other embodiments will be described below. Although the time window W3 and the time window W4 have the same length in the above-described embodiment, the present invention is not limited thereto.

Figure 6:
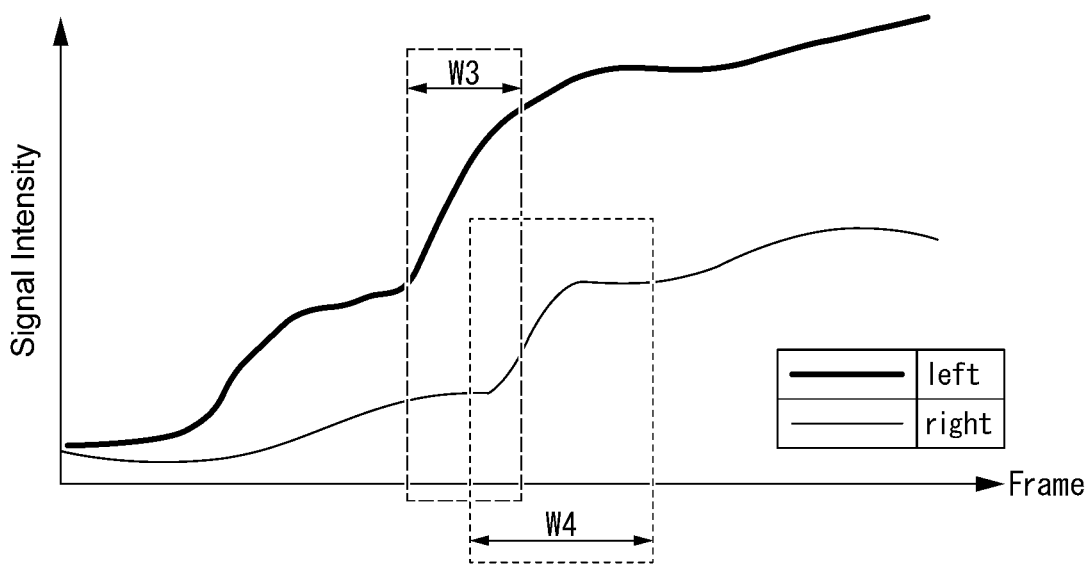
FIG. 6 is a diagram describing a method for setting a time window.

FIG. 6 is a diagram describing a method for setting a time window. As shown in FIG. 6, the time window W4 may be longer than the time window W3. On the contrary, the time window W4 may be shorter than the time window W3.

In addition, although regions of interest having the same area are set in the left lung and the right lung in the above-described embodiment, the present invention is not limited thereto. For example, the first region of interest 51 set in the left lung and the second region of interest 52 set in the right lung may have different areas.

Figure 7:
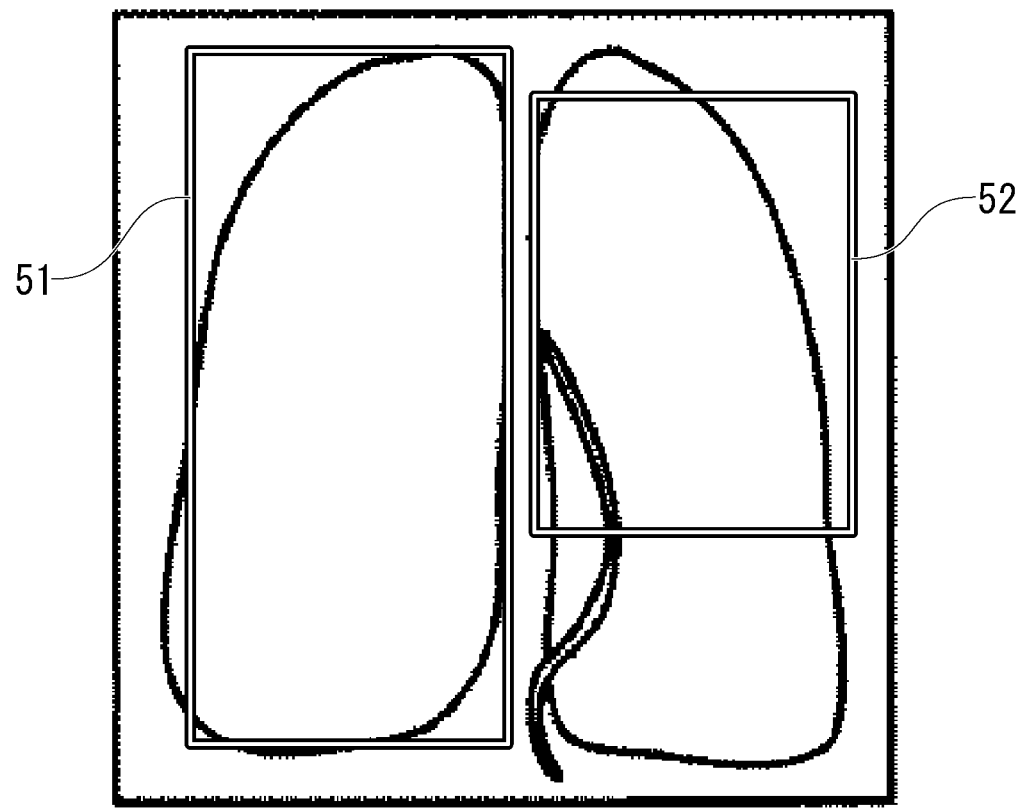
FIG. 7 is a diagram showing another example of an X-ray image in which regions of interest are set.

FIG. 7 is a diagram showing another example of an X-ray image in which regions of interest are set. For example, as shown in FIG. 7, the area of the second region of interest 52 set on the right lung may be smaller than the area of the first region of interest 51 set on the left lung. On the contrary, the area of the second region of interest 52 set on the right lung may be larger than the area of the first region of interest 51 set on the left lung. This makes it possible to reduce the influence of organs and tissues that are not desired to be used for parameter calculation.

Further, although one region of interest is set for each of the left lung and the right lung in the above-described embodiment, the present invention is not limited thereto and a plurality of regions of interest may be set.

Figure 8:
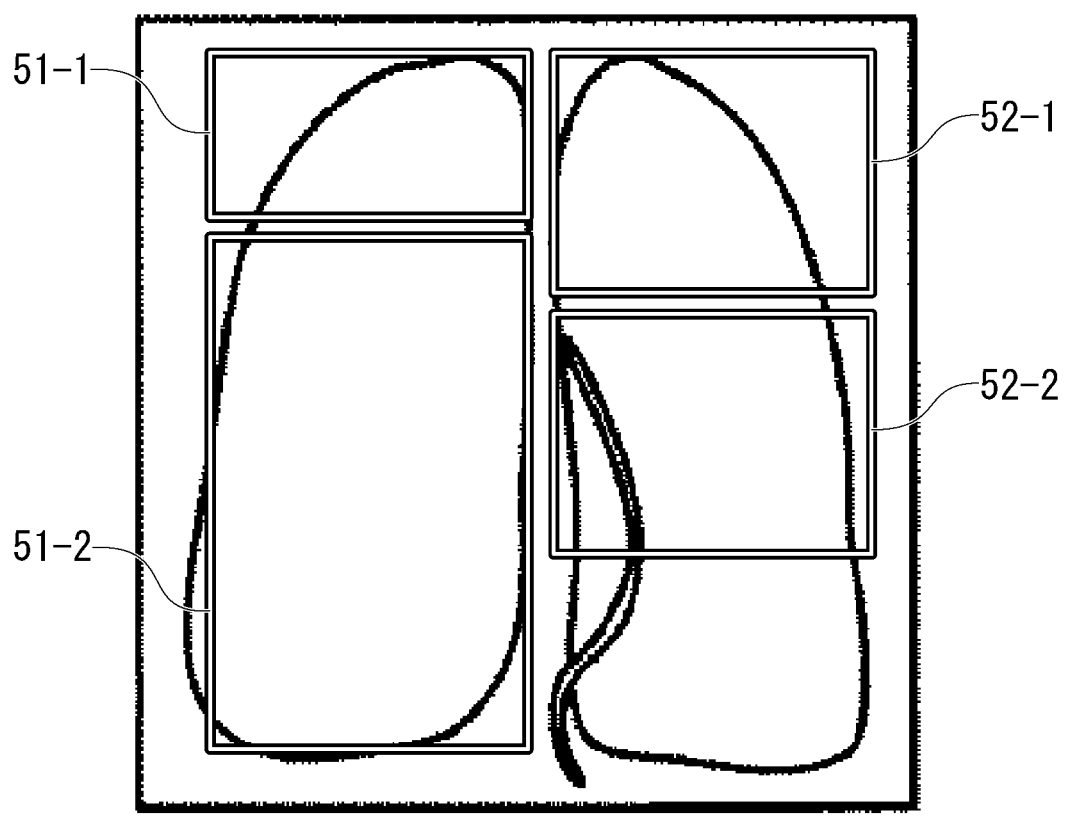
FIG. 8 is a diagram showing another example of an X-ray image in which regions of interest are set.

FIG. 8 is a diagram showing another example of an X-ray image in which regions of interest are set. For example, as shown in FIG. 8, two first regions of interest 51 may be set on the left lung and two second regions of interest 52 may be set on the right lung. Further, the number of first regions of interest 51 may differ from the number of second regions of interest 52. This makes it possible to reduce the influence of organs and tissues that are not desired to be used for parameter calculation.

Further, although the X-ray diagnostic apparatus 100 and the medical image-processing apparatus 200 are different apparatuses in the above-described embodiment, the present invention is not limited thereto. For example, the X-ray diagnostic apparatus 100 and the medical image-processing apparatus 200 may be integrated into one apparatus. For example, the processing circuit 21 of the X-ray diagnostic apparatus 100 may have each function included in the processing circuit 210 of the medical image-processing apparatus 200. In this case, the X-ray diagnostic apparatus 100 can perform various types of processing of the flowcharts described above standalone (offline).

Further, as described above, the technology of the present embodiment can be applied not only to angiography of lungs but also to angiography of bilaterally symmetrical regions such as kidneys, brains, and limbs. Furthermore, the technology of the present embodiment can be applied not only to blood but also to fluids that flow into or out of the body, such as body fluids and exhalation. For example, time-series X-ray images representing states of exhalation in the right lung and exhalation in the left lung may be obtained by causing the subject P to inhale microbeads that are harmless to the human body and attenuate X-rays, and then the technology of the present embodiment may be applied thereto.

Although several embodiments have been described, these embodiments are presented as examples and are not intended to limit the scope of the invention. These embodiments can be implemented in various other embodiments, and various omissions, replacements, and changes can be made without departing from the gist of the invention. These embodiments and modifications thereof are included in the scope of the invention described in the claims and the equivalent scope thereof, as are included in the scope and gist of the invention.

What is claimed is:

1. A medical image-processing apparatus, comprising:
processing circuitry configured to:
   acquire a plurality of medical images including a predetermined region and having different time phases;
   set a first region of interest in a first portion, which is a part of the predetermined region, in each of the plurality of medical images;
   set a second region of interest in a second portion, which is a part of the predetermined region and is different from the first portion in which the first region of interest is set, wherein the predetermined region is a set of bilaterally symmetrical regions in a human or animal body, the first portion is one region of the set of regions, and the second portion is another region of the set of regions;
   derive a temporal change in first pixel values, which are pixel values on the first region of interest, over the plurality of medical images based on the first pixel values;
   derive a temporal change in second pixel values, which are pixel values on the second region of interest, over the plurality of medical images based on the second pixel values;
   set a first time window for imaging the first portion based on the temporal change in the first pixel values; and
   set a second time window for imaging the second portion based on the temporal change in the second pixel values,
   wherein the processing circuitry is further configured to derive a temporal change in third pixel values corresponding to a combination of the first pixel values and the second pixel values,
   set a third time window based on the temporal change in the third pixel values,
   set a fourth time window serving as a candidate period at a time of setting the first time window and the second time window based on the third time window, and
   set the first time window and the second time window within a range of the fourth time window.

2. The medical image-processing apparatus according to claim 1, wherein the processing circuitry is further configured to generate a first parameter with respect to the first portion based on the temporal change in the first pixel values within the first time window and to generate a second parameter with respect to the second portion based on the temporal change in the second pixel values within the second time window.

3. The medical image-processing apparatus according to claim 1, wherein the third time window is a period shorter than at least the fourth time window.

4. The medical image-processing apparatus according to claim 1, wherein the fourth time window is a period equal to or shorter than one heartbeat.

5. The medical image-processing apparatus according to claim 1, wherein the first time window and the second time window are different periods from each other.

6. The medical image-processing apparatus according to claim 1, wherein the area of the first region of interest and the area of the second region of interest are different from each other.

7. The medical image-processing apparatus according to claim 1, wherein a plurality of first regions of interest and a plurality of second regions of interest are set.

8. A medical image-processing method using a computer, the method comprising:
- acquiring a plurality of medical images including a predetermined region and having different time phases;
- setting a first region of interest in a first portion, which is a part of the predetermined region, in each of the plurality of medical images;
- setting a second region of interest in a second portion, which is a part of the predetermined region and is different from the first portion in which the first region of interest is set, wherein the predetermined region is a set of bilaterally symmetrical regions in a human or animal body, the first portion is one region of the set of regions, and the second portion is another region of the set of regions;
- deriving a temporal change in first pixel values, which are pixel values on the first region of interest, over the plurality of medical images based on the first pixel values;
- deriving a temporal change in second pixel values, which are pixel values on the second region of interest, over the plurality of medical images based on the second pixel values;
- setting a first time window for imaging the first portion based on the temporal change in the first pixel values; and
- setting a second time window for imaging the second portion based on the temporal change in the second pixel values,
- wherein the medical image-processing method further comprises
  - deriving a temporal change in third pixel values corresponding to a combination of the first pixel values and the second pixel values,
  - setting a third time window based on the temporal change in the third pixel values,
  - setting a fourth time window serving as a candidate period at a time of setting the first time window and the second time window based on the third time window, and
  - setting the first time window and the second time window within a range of the fourth time window.

9. A non-transitory computer-readable storage medium storing a program that when executed by a computer, causes the computer to perform a method comprising:
- acquiring a plurality of medical images including a predetermined region and having different time phases;
- setting a first region of interest in a first portion, which is a part of the predetermined region, in each of the plurality of medical images;
- setting a second region of interest in a second portion, which is a part of the predetermined region and is different from the first portion in which the first region of interest is set, wherein the predetermined region is a set of bilaterally symmetrical regions in a human or animal body, the first portion is one region of the set of regions, and the second portion is another region of the set of regions;
- deriving a temporal change in first pixel values, which are pixel values on the first region of interest, over the plurality of medical images on the first pixel values;
- deriving a temporal change in second pixel values, which are pixel values on the second region of interest, over the plurality of medical images on the second pixel values;
- setting a first time window for imaging the first portion on the temporal change in the first pixel values; and
- setting a second time window for imaging the second portion on the temporal change in the second pixel values,
- wherein the medical image-processing method further comprises
  - deriving a temporal change in third pixel values corresponding to a combination of the first pixel values and the second pixel values,
  - setting a third time window based on the temporal change in the third pixel values,
  - setting a fourth time window serving as a candidate period at a time of setting the first time window and the second time window based on the third time window, and
  - setting the first time window and the second time window within a range of the fourth time window.

* * * * *